A. N. Shell,
Roach Trap.

No. 21,726.          Patented Oct. 5, 1858.

UNITED STATES PATENT OFFICE.

A. N. SHELL, OF RICHMOND, VIRGINIA, ASSIGNOR TO WILLIAM S. WOOD AND THOS. N. SHELL, OF SAME PLACE.

ROACH-TRAP.

Specification of Letters Patent No. 21,726, dated October 5, 1858.

*To all whom it may concern:*

Be it known that I, ALEXANDER N. SHELL, of Richmond, in the county of Henrico and State of Virginia, have invented a new and Improved Roach-Trap; and I do hereby declare that the following is a full and exact description of the construction and operation of the same, reference being had to the accompanying drawings, making a part of this specification, in which—

Figure 1:
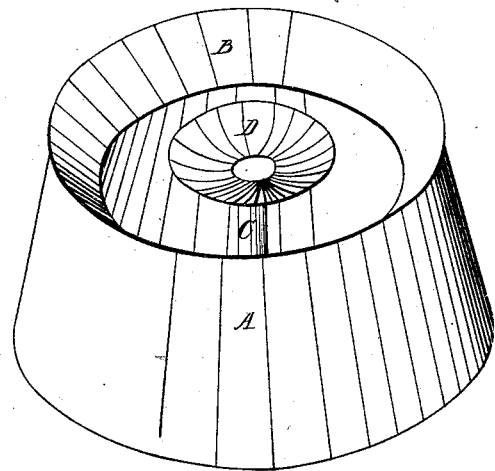
Figure 2:
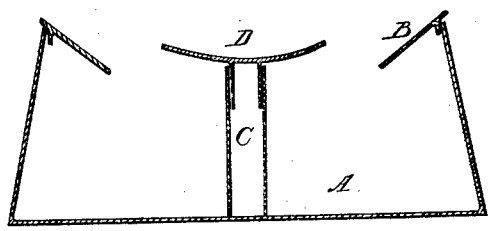

Figure 1st is a perspective view of the trap complete, and Fig. 2nd is a section drawn through the center.

The same letters of reference denote the same parts in both figures.

A is the body of the trap made of metal or other suitable material, the outside of which is coated with sand to give it a roughness so that the roaches can climb up with facility.

On the top of the body of the trap is an annular ring (B) made of smooth metal. This ring inclines inward and downward, toward the center of the trap; this ring must not be made fast to the body of the trap, as it is necessary to detach it when the trap requires to be emptied.

In the center of the trap is an upright stem (C) which supports the bait pan D. This pan must also be made loose so as to be lifted off when the trap is to be emptied, otherwise the bait would be spilled over the floor, or into the trap. This bait pan must be placed nearly on a level with the top of the trap, so that when the roaches ascend the outside of the trap they are enabled to see, or smell the bait in the pan, and begin to travel toward it, in doing which they descend down the inclined annular ring and drop off the edge into the body of the trap; the position of the bait pan in regard to the annular ring is clearly shown in Fig. 2nd.

The pan D is baited with sugar, molasses or other suitable bait, and it will be perceived that the roaches are caught before they get to the bait, which remains to entice others to follow, while it is out of the reach of those that are already in the trap.

What I claim as new and desire to secure by Letters Patent of the United States is—

The center bait pan (D) in combination with the annular ring (B) when located as shown, and described for the purposes set forth.

ALEXANDER N. SHELL.

Witnesses:
A. BODEKER,
WM. H. PLEASANTS.